Aug. 1, 1933.  A. G. F. WALLGREN  1,920,726
BEARING
Filed Feb. 8, 1932   5 Sheets-Sheet 1

INVENTOR
August Gunnar Ferdinand Wallgren
BY
his ATTORNEY

Aug. 1, 1933.  A. G. F. WALLGREN  1,920,726

BEARING

Filed Feb. 8, 1932  5 Sheets-Sheet 3

INVENTOR
BY
his ATTORNEY

Aug. 1, 1933.   A. G. F. WALLGREN   1,920,726
BEARING
Filed Feb. 8, 1932   5 Sheets-Sheet 4

INVENTOR
August Gunnar Ferdinand Wallgren
BY
his ATTORNEY

Aug. 1, 1933.  A. G. F. WALLGREN  1,920,726
BEARING
Filed Feb. 8, 1932  5 Sheets-Sheet 5

INVENTOR
August Gunnar Ferdinand Wallgren
BY
ATTORNEY

Patented Aug. 1, 1933

1,920,726

UNITED STATES PATENT OFFICE 1,920,726

BEARING

August Gunnar Ferdinand Wallgren, Stockholm, Sweden, assignor to Aktiebolaget Nomy, Stockholm, Sweden, a Corporation of Sweden Application February 8, 1932, Serial No. 591,467, and in Sweden and Germany February 13, 1931

24 Claims. (Cl. 308—73)

The present invention relates to anti-friction bearings of the sliding block type in which a plurality of bearing blocks are positioned radially between inner and outer bearing members with respect to one of which members, the blocks slide in tilted position so as to form wedge shaped spaced so that wedge shaped oil films are produced between the relatively sliding surfaces. More particularly, the invention relates to bearings of the above type which are capable of rotation in both directions.

A principal object of the invention is to provide a bearing of the above kind which is capable of transmitting axial thrust loads as well as radial loads. A further object is to provide a bearing of the above kind in which the sliding blocks are positioned under the influence of radial thrust loads so as to distribute the pressures resultant from such loads in a manner increasing the capacity of a bearing of given size to transmit axial thrust loads. A still further object of the invention is to provide a bearing of the above kind having an improved means for the proper positioning of the sliding blocks and the proper retention thereof in assembled position.

Other and more detailed objects of the invention, together with the advantages to be derived from its use will be more fully explained in the following description of the several forms of apparatus for carrying the invention into effect which are illustrated in the accompanying drawings forming a part of this specification.

Figure 1:
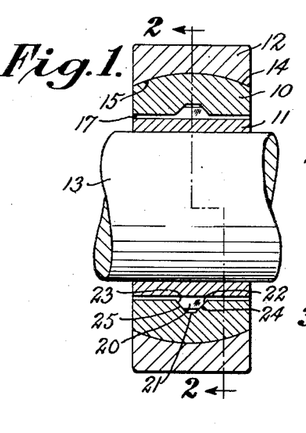
Fig. 1 is an axial central section of a bearing embodying the invention and is taken on the line 1—1 of Fig. 2.
Figure 2:
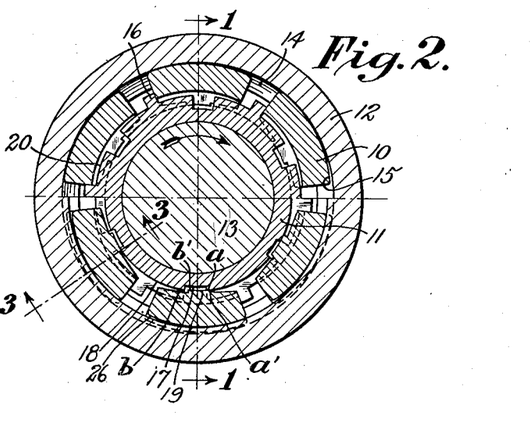
Fig. 2 is a transverse section taken on the line 2—2 of Fig. 1.
Figure 3:
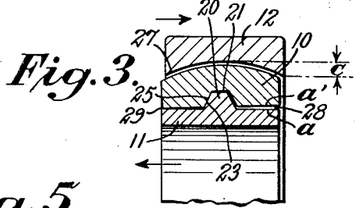
Fig. 3 is an axial section taken on the line 3—3 of Fig. 2 of a part of the structure shown in Figs. 1 and 2, with the part shown in greatly exaggerated displaced position.

In the form of bearing illustrated in Figs. 1 to 3, a plurality of bearing blocks 10 is shown between an inner bearing member 11 and an outer bearing member 12. The inner member 11 is adapted to be mounted on the shaft 13 and the outer member 12 is adapted to be seated in a housing or other element with respect to which shaft 13 is rotatably supported. In the embodiment illustrated, the bearing blocks rotate in operative position with the inner bearing member 11, which will hereinafter be referred to specifically as the inner or carrier ring, and slide with respect to the outer bearing member 12, which will hereinafter be specifically referred to as a bearing race. The bearing race 12 is provided with an inner spherically curved surface 14 and each of the bearing blocks is formed with a complementary spherically curved bearing surface 15 adapted to slide with respect to surface 14.

The carrier ring 11 is provided with peripherally spaced radially extending projections 16, these projections providing abutment surfaces adapted to contact the blocks and to cause them to rotate with the carrier ring. As will be observed from Fig. 2, the peripheral distance between adjacent projections is greater than the peripheral extent of the blocks, whereby the blocks are permitted a certain limited peripheral movement with respect to the carrier ring. The carrier ring is further provided with axially extending grooves 17, the grooves 17 and projections 16 alternating peripherally of the ring. The ring also has cylindrical surfaces 18, which surfaces, adjacent to the edges of grooves 17, provide tilting or supporting surfaces $a$ and $b$.

Each of the blocks 10 is provided with an axial projection 19, the edge portions of which provide spaced supporting surfaces $a'$ and $b'$ adapted to cooperate, in the alternative, with the corresponding surfaces $a$ and $b$ in a manner hereinafter to be described.

The carrier ring is further provided with peripherally extending projections 20 which seat in complementary grooves 21 in the bearing blocks. In the form of bearing illustrated, the projections 16 and 20 are situated in the same transverse plane and, as will be observed from Fig. 2, the projections 16 extend radially outwardly further than do the projections 20.

In accordance with the present invention, the projections 20 are formed with surfaces 22 and 23 for transmitting axial thrust. These surfaces are oblique with respect to the axis of rotation of the bearing and cooperate respectively with complementary oblique surfaces 24 and 25 provided by the grooves 21.

As will be observed from the drawings, these oblique cooperating surfaces are divided into two groups, one of which is constituted by surfaces 22 and 24 and the other of which is constituted by surfaces 23 and 25. It will further be observed that the two groups are oppositely oblique with respect to each other.

The operation of the bearing is as follows, assuming the direction of rotation thereof to be as indicated by the arrow in Fig. 2. Upon rotation in this direction, the blocks move, under the influence of frictional drag, to the positions shown in the figure, with the rearward ends (considered in the direction of motion) of the blocks in contact with the projections 16 and with the supporting surfaces $a$ and $a'$ in contact. In this position, the blocks assume tilted positions so that wedge shaped spaces 26 are provided between the cooperating sliding surfaces of the blocks of the outer race 12. The blocks are permitted to assume their tilted positions by movement of the supporting surfaces $b'$ radially inwardly into spaces provided by the grooves 17. The wedge shaped spaces 26 provide for the formation of load sustaining oil films between the relatively moving surfaces 14 and 15.

Upon reversal of the direction of rotation of the carrier ring, the blocks shift peripherally to bring the supporting surfaces $b$ and $b'$ into contact and with these surfaces in contact, the blocks tilt in opposite direction, with the supporting surfaces $a'$ in the spaces provided by the grooves 17. With respect to this phase of operation, the bearing illustrated is similar to the bearing disclosed in the copending application, Serial No. 277,769 filed May 14, 1928, Pat. No. 1,871,485, granted August 16, 1932, to which reference may be had for a more detailed description.

Turning now more particularly to Figs. 1 and 3, it will be evident that the cooperating oblique surfaces 22–25 provided means for preventing displacement of the blocks 10 with respect to the carrier ring under the influence of axial thrust loads. It will further be evident that with the inner and outer bearing members in operative position with respect to each other, the radial extent of the spherically curved surfaces 14 and 15 will prevent axial displacement of the blocks with respect to the outer bearing member or race 12 under the influence of axial thrust loads. The bearing is, therefore, capable of transmitting axial thrust loads and the reason for the ability of the bearing to transmit such loads in improved manner is as follows.

Let it be assumed that an axial thrust load is imposed on the bearing in a manner producing axial forces acting in the direction of the arrows in Fig. 3. This force will move or will tend to move the carrier ring axially with respect to the outer bearing race in the manner indicated in exaggerated form in Fig. 3. As will hereinafter appear, the movement which actually occurs is ordinarily extremely small. The blocks 10 will move with the carrier ring and this relative axial movement between the blocks and the race 12 will cause an increase in pressure between the surfaces 14 and 15 at the area indicated at 27 adjacent to or at the edge of the race 12. It will be evident that if the blocks 10 move parallel to themselves from the positions, with respect to the race 12, shown in Fig. 1, to the positions, with respect to this race, shown in Fig. 3, the surfaces 14 and 15 will no longer be concentric and, because of the lack of concentricity, uneven pressure between these surfaces would result. Upon movement of a block to a position such as shown in Fig. 3, a reaction force is set up between surfaces 23 and 25 which force, on account of the positioning of these surfaces, produces a tendency to tip the block to the position shown in this figure. This tipping of the block is sufficient to bring the surfaces 14 and 15 into or substantially into parallelism as viewed in Fig. 3 and results in a substantially unchanged condition of the oil film between the blocks and the bearing race in spite of movement of the carrier ring and blocks in axial direction with respect to the race on account of axial thrust load. From this it follows that more effective utilization is made of the radially projected area (represented by the radial extent $c$ of the bearing surface times the circumference of this surface) of the sliding surfaces, for the purpose of transmitting axial thrust loads, than would be the case if the bearing blocks were not tipped to provide oil films of substantially uniform character axially of the bearing. In other words, the action of a bearing embodying the present invention, under the influence of axial thrust loads is to, in effect, increase the effective bearing area for transmission of axial thrust loads.

As noted above, the tipped position of the blocks with respect to the carrier ring has been grossly exaggerated in order to illustrate this characteristic of the invention. Furthermore, in order to illustrate the relative movement of the parts in exaggerated form, there has been shown a space 28 between the tilting surfaces $a$ and $a'$ which space is wedge shaped in axial direction.

This might lead one to suppose that under conditions of axial thrust load the normal line contact between surfaces $a$ and $a'$ would be destroyed and in its place only point contact would be obtained between these surfaces at the point 29. This, however, is not the case. As previously pointed out, actual axial displacement which occurs is small and the tipping of the blocks is effected due to compression, within the elastic limits of the material, of the tilting surfaces $a$ and $a'$ which compression deforms the metal sufficiently to expand the contact from the point 29 along the normal line of contact between the surfaces $a$ and $a'$.

Figure 4:
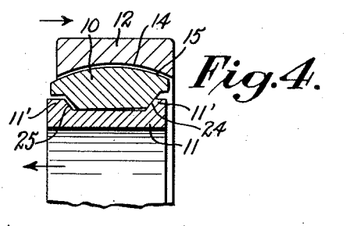
Fig. 4 is a view similar to Fig. 3, illustrating a variation of the form of bearing shown in Fig. 3.
Figure 5:
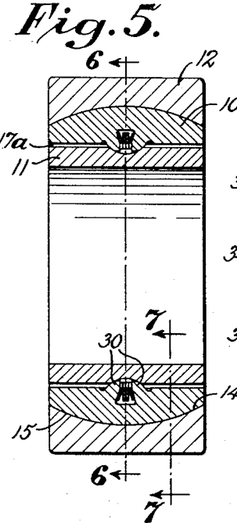
Fig. 5 is a section similar to Fig. 1 illustrating another form of bearing embodying the invention and is taken on the line 5—5 of Fig. 6.

In Fig. 4 a variation of the arrangement shown in Fig. 3 has been illustrated. In this form, the axially central projection 20 on the carrier ring is replaced by axially spaced projections 11' providing oblique tipping surfaces 24 and 25 corresponding to the tipping surfaces, shown in Fig. 3. As will be evident from a comparison of Figs. 3 and 4, the tipping action of the blocks under the influence of axial thrust loads will be the same in each of these forms. The remaining construction of the bearing shown in Fig. 4 may be similar to that of the modification shown in Figs. 1 to 3.

In both of the foregoing forms of bearings, the projections providing the axial thrust transmitting surfaces are on the carrier ring 11, while the blocks are grooved to provide complementary cooperating surfaces.

In Figs. 5 to 13, an embodiment of the invention is illustrated in which the blocks 10 are provided with peripherally extending projections 30 located axially centrally of the bearing, these projections entering an interrupted groove in the carrier ring 11, this interrupted groove providing a plurality of peripherally extending recesses 31 separated by axially extending webs 32. The number of recesses 31 corresponds to the number of blocks. The end walls 33 and 33' of the recesses 31 provide abutment surfaces for limiting the peripheral movement of the blocks 10 with respect to the carrier ring. Limited movement of the blocks is permitted due to the greater peripheral length of the recesses 31 than the peripheral length of the projections 30 extending into these recesses. Functionally the webs 32 correspond to the projections 16 shown in Fig. 2. The carrier ring is also provided (see Fig. 7) with a plurality of peripherally spaced axially extending grooves 17a which may advantageously be of arcuate cross-section. These grooves are similar to the grooves 17 in Fig. 2. Between grooves 17a are the cylindrical surfaces 18 providing, at the edges of the grooves, the tilting surfaces $a$ and $b$ which cooperate with the surfaces $a'$ and $b'$ on the blocks to cause tilting of the same in the manner previously described.

Figure 8:
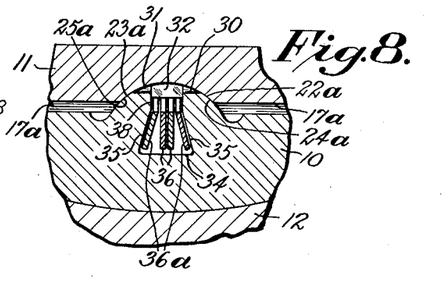
Fig. 8 is an axial section on enlarged scale showing a part of the structure illustrated in Fig. 5.

As is more clearly illustrated in Fig. 8, the projections 30 and recesses 31 provide groups of complementary surfaces 23a, 25a and 22a, 24a which correspond functionally with the surfaces 23, 25 and 22, 24 shown in Fig. 3. In the present embodiment, these surfaces are curved in axial cross-section instead of being plane as are the surfaces shown in Fig. 3. In both cases, however, the cooperating portions of the surfaces are oblique with respect to the axis of rotation of the bearing and it will be evident that these surfaces co-act to cause tipping of the blocks under the influence of axial thrust loads in the same manner as do the corresponding surfaces in the embodiment described in connection with Fig. 3.

The present form of bearing is, in accordance with the present invention, further provided with means for limiting the axial movement of the bearing blocks with respect to the carrier ring in order to prevent the blocks from falling out of the bearing when the inner and outer bearing members are angularly displaced so that the blocks are out of contact with the outer bearing member or race 12. The arrangement also provides means for preventing peripheral movement of any of the blocks relative to the carrier ring except upon reversal of direction of rotation of the bearing. In this respect, the present embodiment incorporates the primary function of the invention disclosed in the copending application of August Gunnar Ferdinand Wallgren and Carl Gustaf Janson, Serial No. 571,875, filed October 29, 1931.

Figure 9:
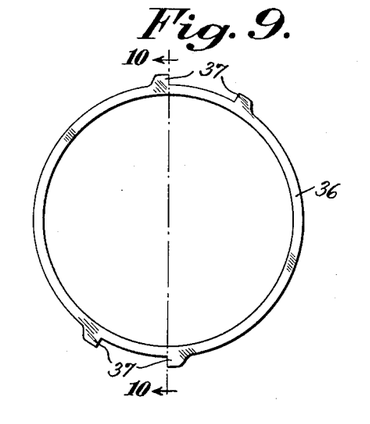
Fig. 9 is a view showing in elevation a bearing part.
Figure 10:
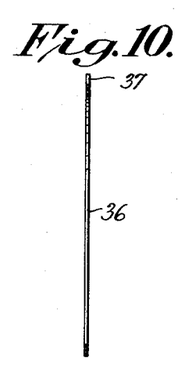
Fig. 10 is a view of the part shown in Fig. 9, taken on the line 10—10 of Fig. 9.
Figure 11:
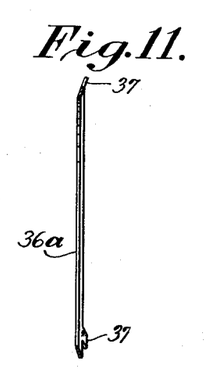
Fig. 11 is a view similar to Fig. 10 showing another similar part of the bearing.
Figure 12:
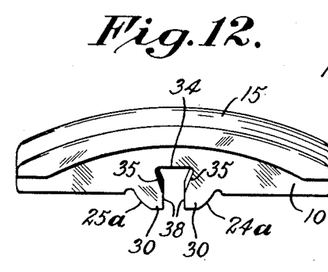
Fig. 12 is a view of one of the bearing blocks.

In the present arrangement, recesses in the form of peripherally extending grooves 34 are provided in the bearing blocks, these grooves being formed in the projections 30 and situated axially between the surfaces 24a and 25a. The grooves are, further, wider at the bottoms thereof than at the tops. In the specific embodiment illustrated, the grooves are of dovetail form but any suitable groove or recess may be used which provides retaining surface such as surfaces 35. A plurality of block retaining members in the form of rings 36 are provided, these rings being adapted to encircle the carrier ring and to extend into grooves 34 in the blocks. Each of the rings 36 is provided with a plurality of projections 37 extending radially outwardly and, as shown in Fig. 9, arranged in opposed pairs. Each pair of projections 37 is adapted to retain therebetween one of the blocks 10 and, as will be evident from Fig. 6, each ring serves to hold two diametrically opposed blocks against substantially relative peripheral movement with respect to each other. Enough clearance is provided between the ends of the blocks and the projections 37 to permit the blocks to tilt. In the present embodiment wherein 8 blocks are employed, four retaining rings 36 are used, each ring engaging a different pair of blocks.

As appears most clearly from Fig. 8, the two axially outer retaining rings 36a are dished outwardly so as to contact the walls 35 of the groove 34, while the intermediate rings are advantageously made plane. Those rings which are dished are advantageously made of resilient material and the thickness of the rings is chosen so that when the rings are pressed together, the outer thickness thereof is somewhat less than the axial width of groove 34 at 38. In assembling the bearing, the rings are placed in position on the carrier ring with the plane rings between the dished rings and the blocks are then placed in assembled position on the carrier ring by snapping the blocks over the retaining rings, this being possible due to the resilient character of the outer dished rings. Obviously, when the retaining rings are placed in position, they should be placed in such peripheral relation with respect to each other, that each block, when it is snapped into its assembled position, is located between a proper pair of projections 37.

Due to the axial clearance between the retaining rings and the side walls of the groove 34, relative peripheral movement between the rings is permitted. This permits proper shifting of the blocks upon reversal of rotation of the bearing. From Figure 8, it will be evident that the retaining rings will effectively prevent the blocks from falling out of the bearing when not retained therein by contact with the outer race.

Figure 6:
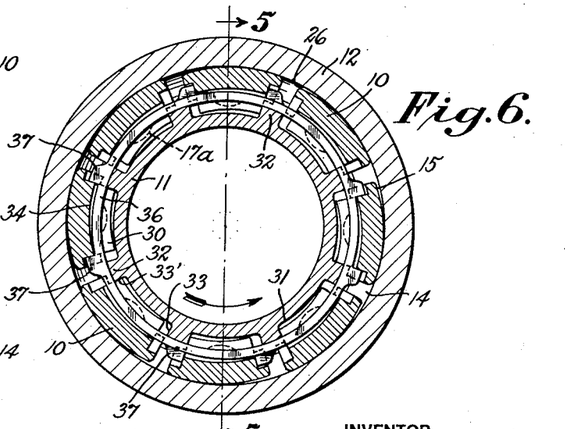
Fig. 6 is a transverse section taken on the line 6—6 of Fig. 5.

The retaining rings further prevent undesirable peripheral shifting of the blocks with respect to the carrier ring. As is more fully explained in the aforementioned application, Serial No. 571,875, there is a tendency, under certain conditions for the blocks to tilt into the wrong position unless the blocks are restrained. Referring to Fig. 6 and assuming a direction of rotation as shown by the arrow in this figure and a downwardly acting load on the carrier ring, it will be evident that the blocks are in a relatively unloaded zone when they are in the upper part of the bearing. The blocks moving upwardly on the right hand side of the bearing (Fig. 6) are in the tilted position in which the surfaces $a$ and $a'$ (Fig. 7) are in contact. Both the weight of the blocks and the frictional resistance to sliding movement of the blocks with respect to the bearing race tend to keep the blocks in this position while they are moving upwardly. This is the correct position for the blocks for the assumed direction of rotation.

After the blocks have passed the upper dead center position, the force of gravity acting thereon acts in opposition to the force resulting from frictional resistance to movement and since the latter force is comparatively slight, (the blocks being in an unloaded zone) the force due to gravity might in some instances cause the blocks to move peripherally (drop) with respect to the carrier ring so that the surfaces $b$ and $b'$ come into contact, thus causing the blocks to tilt into the position proper for reverse direction of rotation. If this occurs, the blocks go into the loaded zone at the lower left hand portion of the bearing, as seen in Fig. 6, tilted the wrong way. By means of the elements 36 connecting diametrically opposed blocks, this tendency of the blocks to move out of their correct position when travelling downwardly in the unloaded zone is prevent by opposing to the force of gravity acting on the blocks on the left hand side, the force of gravity acting on the blocks on the right hand side of the bearing. The frictional resistance acting on both right hand and left hand blocks tends to hold the blocks in the proper position. It will thus be evident that the right hand block controls and that with opposed blocks held against peripheral movement, the blocks are held in their proper positions throughout their path of rotation. From the standpoint of ease of manufacture, it may be advantageous to form the inner carrier ring for this embodiment of the bearing in the manner shown in Fig. 14.

Figure 13:
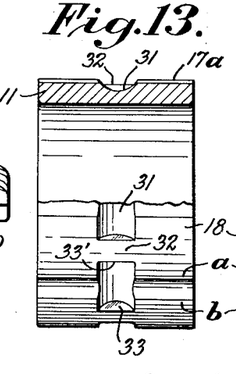
Fig. 13 is a side elevation partly in section of the inner bearing member shown in Fig. 5.

In the form of ring shown in Fig. 13, the recesses 31 may be made most advantageously by means of a milling cutter of small diameter, the axis of which, when the cutter is in operating position, is tangential with respect to the carrier ring.

Figure 7:
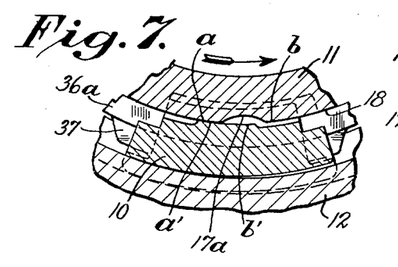
Fig. 7 is a transverse section on enlarged scale taken on the line 7—7 of Fig. 6.
Figure 14:
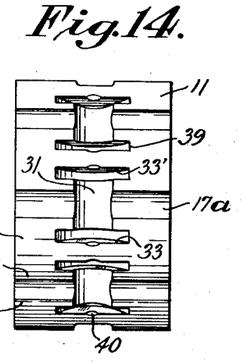
Fig. 14 is a side elevation showing a modified form of the bearing member illustrated in Fig. 13.

On the other hand, in the form of ring shown in Fig. 14, the recesses 31 may be formed by means of an end milling cutter, the axis of rotation of which during the milling operation is coincident with a radius from the center of the carrier ring. Such an end milling cutter can be formed to provide a recess of desired cross-section. This can be an arc as illustrated in Fig. 14 and Fig. 7 or the recess can have a cross-section providing plane oblique sides against which correspondingly plane sides of the projections 30 can abut. An end milling cutter will obviously not provide plane ends for the recesses but will form arcuate end surfaces. In order to provide the proper abutment surfaces 33 and 33', the ends of the recesses should be plane. In order to secure these plane surfaces, the end portions of the recesses 31 are formed by means of a milling cutter, the axis of which is at right angles of the axis of rotation of the carrier ring, but in this instance, the milling cutter may have a much larger diameter than the similarly positioned milling cutter used in making a ring of the form shown in Fig. 13 can have. With this relatively large diameter milling cutter, end slots 39 are formed. Due to the fact that the projections 30 on the blocks are provided with the centrally located peripheral grooves 34, these projections bear on the end surfaces of the recesses only at the sides of the central transverse plane of the carrier ring, and for this reason, the slots 39 need not be made wide enough to provide a completely plane end surface. The slots 39 may be made narrow, as shown in Fig. 14, leaving the curved surfaces 40 formed by the end milling cutter, since these latter surfaces are not utilized to cooperate with any other surfaces.

Figure 15:
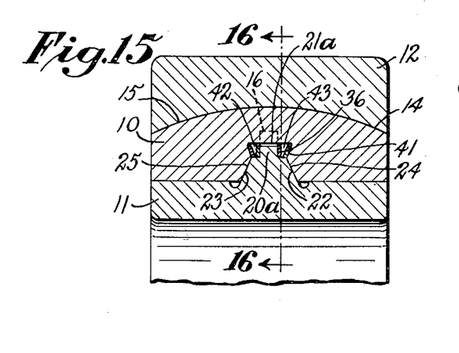
Fig. 15 is an axial section showing part of another form of bearing and is taken on the line 15—15 of Fig. 16.
Figure 16:
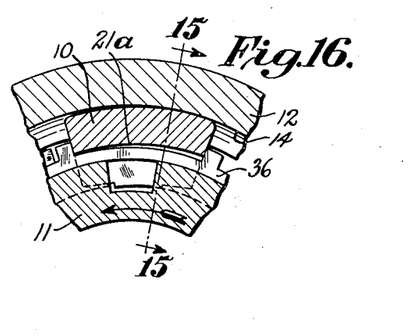
Fig. 16 is a transverse section taken on the line 16—16 of Fig. 15.
Figure 17:
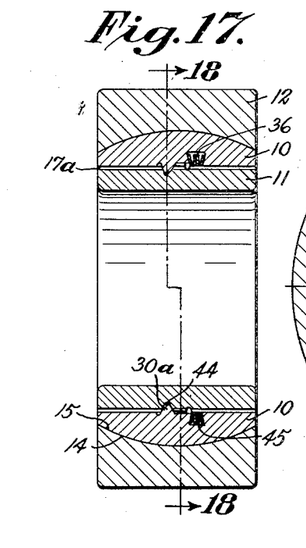
Fig. 17 is a view similar to Fig. 1 showing still another form of bearing and is taken on the line 17—17 of Fig. 18.
Figures 18, 20:
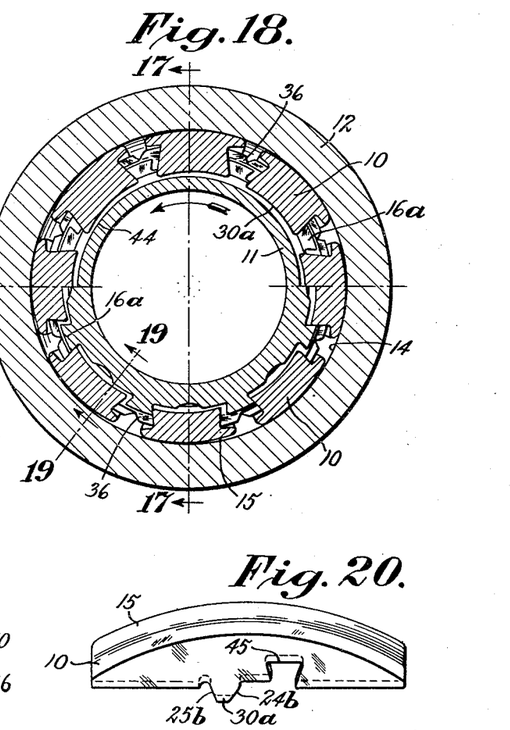
Fig. 18 is a transverse section taken on the line 18—18 of Fig. 17.
Fig. 20 is a view of one of the bearing blocks for the bearings shown in Fig. 17.
Figure 19:
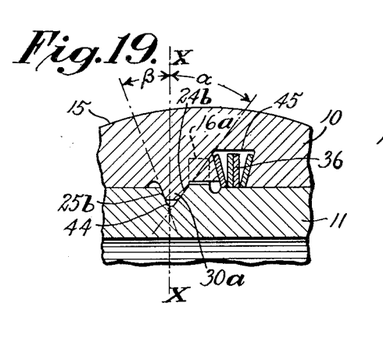
Fig. 19 is a section on enlarged scale taken on the line 19—19 of Fig. 18 showing a part of the structure illustrated in Figs. 17 and 18.
Figure 21:
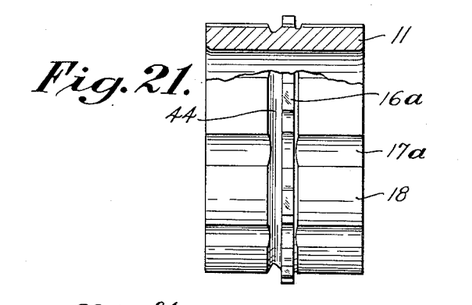
Fig. 21 is a side elevation, partly in section, of the inner bearing member shown in Fig. 17.
Figures 22, 23:
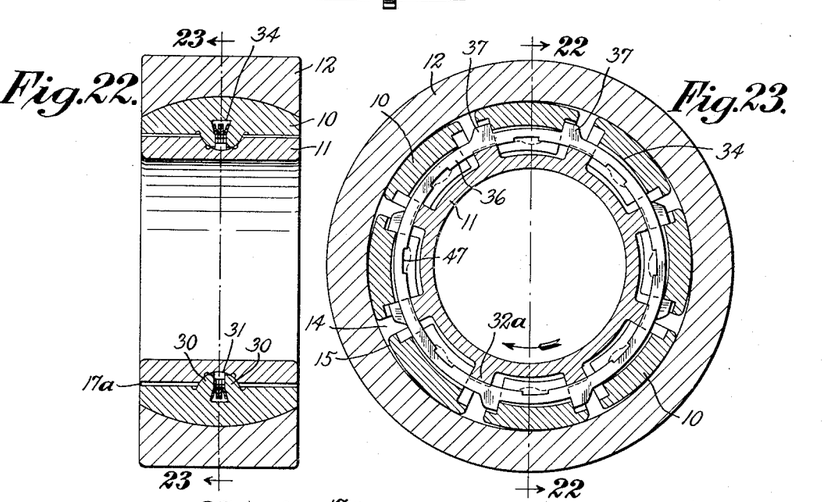
Fig. 22 is a section similar to Figure 1 showing still another form of bearing and is taken on the line 22—22 of Fig. 23.
Fig. 23 is a transverse section taken on the line 23—23 of Fig. 22.
Figure 24:
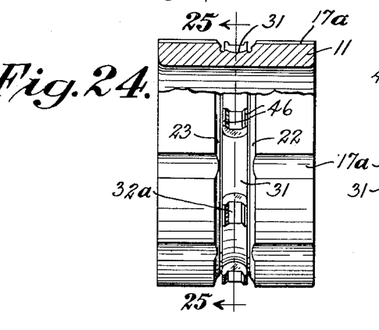
Fig. 24 is a side elevation, partly in section, of the inner bearing member shown in Fig. 22.
Figure 25:
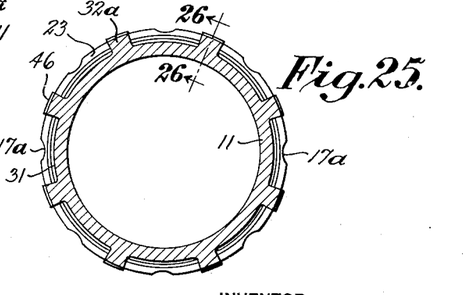
Fig. 25 is a section taken on the line 25—25 of Fig. 24.
Figure 26:
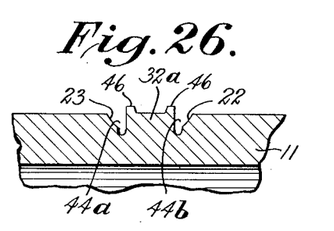
Fig. 26 is a section on enlarged scale taken on the line 26—26 of Fig. 25.

Turning now to Figs. 15 and 16, a further embodiment of the invention is shown in which the projections on the carrier ring provide oblique plane tipping surfaces 22 and 23, as in the form shown in Fig. 1. In the present form, however, the grooves $21a$ in the bearing blocks are tapered inwardly to provide tipping surfaces 24 and 25 and are then undercut at the bottom as indicated at 41. The projections are shouldered to provide centrally located flanges $20a$ projecting radially outwardly from the projections and these flanges and the undercut portions of the grooves 21 provide spaces 42 and 43 for the reception of the block retaining members 36, which, as may be seen from Fig. 15, are advantageously placed with one plane member and one dished member in each of the spaces 42 and 43. In other respects, the construction of the bearing may be generally similar to the construction shown in Figs. 1 to 3.

In the embodiment illustrated in Figs. 17 to 21, the blocks are formed with projections $30a$ of the general type shown in the embodiment illustrated in Figs. 5 to 13. In this form of the bearing, however, the projections $30a$ cooperate with a continuous circumferential groove 44 in the carrier ring, which groove is advantageously placed axially to one side of the central transverse plane of the ring. Projections $30a$ and groove 44 provide cooperating oblique tipping surfaces which function in the manner already described. In this embodiment, the cooperating tipping surfaces are not symmetrical with respect to a plane transverse to the axis of rotation. Due to the axially offset position of the projections and groove, the angle of inclination of the two groups of tipping surfaces with respect to a transverse plane must be different, as is illustrated in enlarged scale in Fig. 19. Referring to this figure, it will be observed that the angle $\alpha$ between the plane of the surfaces $24b$ and the transverse plane $x—x$ is greater than the angle $\beta$ between the plane of the surfaces 25b and the plane x—x. The reason for making these surfaces with different degrees of inclination will be evident from a consideration of Fig. 17 which illustrates the offset position of the surfaces with respect to the axial central plane of the bearing. By forming these surfaces with different degrees of inclination, the tipping moment produced on the blocks will be the same, or approximately the same, regardless of the direction of the axial thrust load on the bearing. For example, if the carrier ring is subjected to an axial thrust load from left to right (Figs. 17 and 19), the thrust is transmitted to the blocks from the surfaces 25b along lines forming a more acute angle with the axis of rotation of the bearing than is the case when the thrust load on the carrier ring is from right to left and the thrust load is transmitted to the blocks by surfaces 24b.

Axially to one side of the groove 44 and advantageously in the axial central plane of the bearing, the projections 16a are provided, which projections correspond in function to the projections 16 shown in Fig. 2. As will be observed from Fig. 18, the projections 16a are of generally dovetail form in cross-section, this construction providing certain advantages in connection with movement of the blocks to different degrees of tilt. This forms, per se, no part of the present invention and constitutes the claimed subject matter of the copending application of Carl Gustaf Janson, Serial No. 479,621, filed September 4, 1930.

On the axial side of projections 16a opposite to the projections 30a, the blocks are grooved as at 45 to provide recesses for the reception of block retaining rings 36 of the type previously described in connection with the embodiment shown in Figs. 6 to 13.

Figs. 22 to 27 illustrate a still further embodiment of the invention in which peripherally spaced recesses 31 are separated by webs 32a and provide abutment surfaces for carrying the blocks peripherally with the carrier ring. The blocks are provided with projections 30 extending into the recesses. The construction in this respect is similar to that shown in Figs. 5 to 13. The recesses 31 are in the present embodiment, however, wider axially than are the webs 32a so that the tipping surfaces 22 and 23 are provided by the side walls of two continuous grooves 44a and 44b. The webs 32a in the present embodiment, are in the nature of upstanding studs, as will be seen from Figs. 24 and 26.

The recesses 34 in the blocks for receiving the retaining rings 36 and 36a, are formed in the manner already described in connection with Figs. 5 to 13, the rings being placed between axially spaced peripheral projections 46 on the webs 32a.

Figure 27:
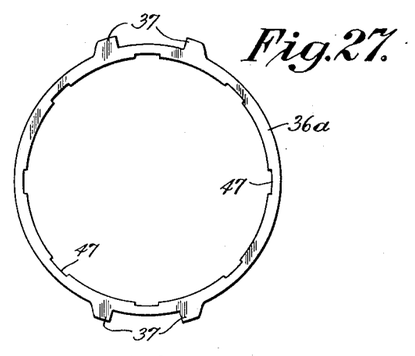
Fig. 27 is an elevation of a part of the bearing shown in Fig. 17.

As will be seen from Fig. 27, rings 36 and 36a are provided with notches 47 which permit the rings to be slipped over the projections 46. It will be noted that the projections 46 provide additional bearing area for the abutment surfaces on webs 32a.

Figure 28:
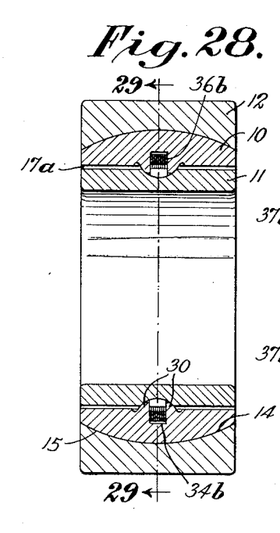
Fig. 28 is a view similar to Fig. 1 illustrating still another form of bearing and is taken on the line 28—28 of Fig. 29.
Figure 29:
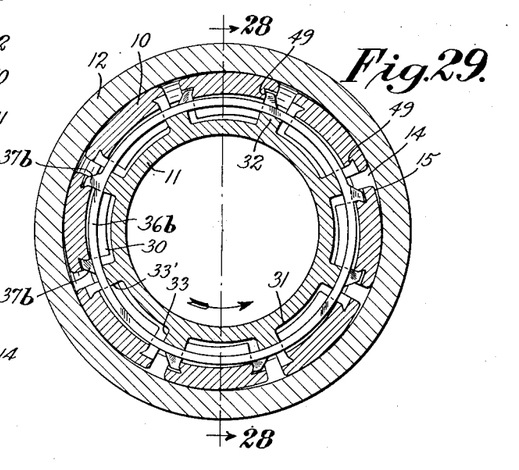
Fig. 29 is a section taken on the line 29—29 of Fig. 28.
Figure 30:
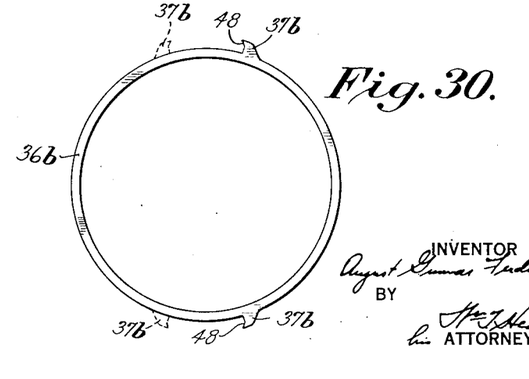
Fig. 30 is a view showing in elevation parts of the bearing illustrated in Fig. 28.

In Figs. 28 to 30, another embodiment is illustrated in which a different form of block retaining member or ring is employed. In this embodiment, the rings 36b are all plane and are set into peripherally extending grooves 34b, the side walls of these grooves being parallel to each other, as appears from Fig. 28. In this instance, each two diametrically disposed blocks are connected to prevent peripheral displacement with respect to each other by two rings 36b instead of by a single ring as in the previously described forms. Thus, in the present instance, the number of retaining rings corresponds to the number of blocks. Each retaining ring is provided with two peripherally spaced, outwardly extending projections 37b. The edges 48 of these projections are not radial but of hooked-like configuration adapted to seat in wedge-like recesses 49 in the blocks. In assembling the bearing, the two rings utilized to engage two opposed blocks are turned oppositely to each other, as indicated in Fig. 30, in which figure, the projections 37b of a ring directly behind the ring shown in full lines, are indicated by dotted lines. By moving two such rings in opposite direction of rotation with respect to each other, it will be evident that two blocks can be grasped by respective pairs of opposed projections 37b. The projections 37b are so arranged that once a block is set in proper position in the bearing, the block can be removed from between the projections on its retaining rings by resilient distortion of these rings and the blocks are accordingly held by the rings in proper position in the bearing and are prevented from falling out of the bearing under conditions bringing them out of contact with the outer bearing race.

In other respects, the bearing shown in Figs. 28 to 30 is made like the bearing illustrated in Figs. 5 to 13.

While, in compliance with the patent statutes, the best forms of apparatus now known for carrying the invention into effect have been illustrated and described, it will be evident that the invention may embrace many other forms of apparatus and it will further be evident that certain features of the invention may be employed to the exclusion of others without departing from the scope of the invention as defined in the appended claims.

What is claimed is:

1. A bearing comprising inner and outer bearing members and a plurality of blocks having operative positions radially between said members, one of said members and said blocks having cooperating surfaces curved in axial direction and adapted to slide with respect to each other, and the other of said members and said blocks having cooperating surfaces positioned obliquely with respect to the axis of rotation of the bearing and tending to cause the blocks to tip under the influence of axial thrust load on the bearing.

2. A bearing comprising inner and outer bearing members and a plurality of blocks having operative positions radially between said members, one of said members and said blocks having cooperating surfaces curved in axial direction and adapted to slide with respect to each other, and the other of said members and said blocks having groups of cooperating thrust transmitting surfaces positioned obliquely with respect to the axis of rotation, the surfaces of one group tending to cause the blocks to tip in one direction under the influence of axial thrust load in one direction and the surfaces of another of said groups being positioned oppositely oblique with respect to the surfaces of said one group to cause the blocks to tip in opposite direction under the influence of thrust load in opposite direction.

3. A bearing comprising inner and outer bearing members and a plurality of blocks having operative positions radially between said members, one of said members and said blocks having cooperating surfaces curved in axial direction and adapted to slide with respect to each other, and the other of said members and said blocks having cooperating surfaces including two groups of peripherally extending surfaces positioned obliquely with respect to the axis of rotation of the bearing, said groups of surfaces being oppositely oblique with respect to each other and converging toward said one member of said members.

4. A bearing comprising an inner carrier ring, an outer race and a plurality of bearing blocks having tilted operating positions radially between said ring and said race, said race and said blocks having complementary spherically curved surfaces adapted to slide with respect to each other and said ring and said blocks having cooperating peripherally extending surfaces for transmitting axial thrust load, said last named surfaces being oblique with respect to the axis of rotation of the bearing.

5. A bearing comprising an inner carrier ring, an outer race and a plurality of bearing blocks having tilted operating positions radially between said ring and said race, said race and said blocks having complementary spherically curved surfaces adapted to slide with respect to each other and said ring and said blocks having two groups of peripherally extending cooperating surfaces, said last mentioned surfaces being positioned obliquely with respect to the axis of rotation of the bearing, the surfaces of one group being oppositely oblique with respect to the surfaces of the other group, and the surfaces of one group converging with respect to the surfaces of the other group radially outwardly of the bearing.

6. In a bearing, in combination, a carrier ring, a bearing race and a bearing block positioned radially between said ring and said race, means for limiting peripheral movement of the block with respect to said ring, means for causing the block to tilt to form a wedge shaped space between the block and the race upon relative rotation therebetween, and means tending to tip the block under the influence of axial thrust load on the bearing.

7. In a bearing, a carrier ring, a bearing race and a bearing block positioned radially between said ring and said race, means for limiting peripheral movement of the block with respect to said ring, means for causing the block to tilt to form a wedge shaped space between the block and the race upon relative rotation therebetween, and means tending to tip the block under the influence of axial thrust load on the bearing, said last named means comprising peripherally extending cooperating surfaces on the block and the ring, and said surfaces being oblique with respect to the axis of rotation of the bearing.

8. In a bearing, a carrier ring, a bearing race and a bearing block positioned radially between said ring and said race, means for limiting peripheral movement of the block with respect to said ring, means for causing the block to tilt to form a wedge shaped space between the block and the race upon relative rotation therebetween, and means tending to tip the block under the influence of axial thrust load on the bearing, said last named means comprising a projection on said block providing a peripherally extending surface oblique with respect to the axis of rotation of the bearing and a groove in said carrier ring providing a complementary surface adapted to engage said first mentioned surface.

9. In a bearing, a carrier ring, a bearing race and a bearing block positioned radially between said ring and said race, means for limiting peripheral movement of the block with respect to said ring, means for causing the block to tilt to form a wedge shaped space between the block and the race upon relative rotation therebetween, and means tending to tip the block under the influence of axial thrust load on the bearing, said last named means comprising a projection on said block providing peripherally extending axially spaced surfaces oppositely oblique with respect to the axis of rotation of the bearing and a groove in said carrier ring providing complementary surfaces adapted to engage said first mentioned surfaces.

10. In a bearing, an inner carrier ring, an outer race, a bearing block having an operative position radially between said ring and said race, said block and said race having surfaces curved in axial direction and adapted to slide with respect to each other, a peripherally extending projection on said carrier ring, said projection tapering in radially outward direction and providing surfaces oppositely oblique with respect to the axis of the bearing, and a groove in said block providing complementary oblique surfaces, said oblique surfaces cooperating to cause the block to tend to tip in one direction under the influence of axial thrust load in one direction and to tend to tip in opposite direction under the influence of axial thrust load of opposite direction.

11. In a bearing, a carrier ring, a bearing race, a block positioned radially between said ring and said race, means for limiting peripheral movement of the block with respect to said ring, means for causing the block to tilt to form a wedge shaped space between the block and the race upon relative movement therebetween, means tending to tip the block under the influence of axial thrust load on the bearing and means independent of said race for limiting radial displacement of the block with respect to said ring.

12. In a bearing, a carrier ring, a bearing race, a block positioned radially between said ring and said race, means for limiting peripheral movement of the block with respect to said ring, means for causing the block to tilt to form a wedge shaped space between the block and the race upon relative rotation therebetween, means tending to tip the block under the influence of axial thrust load on the bearing, said last named means comprising a projection on said block providing peripherally extending surfaces oppositely oblique with respect to the axis of rotation of the bearing and a groove in said carrier ring providing complementary surfaces adapted to engage said first mentioned ring, a peripherally extending groove in said projection between said axially spaced surfaces, and a block retaining member in said groove for limiting radial displacement of the block with respect to said carrier ring.

13. A radial bearing comprising a carrier ring, a bearing race, a plurality of blocks positioned radially between said ring and said race, means for limiting peripheral movement of the blocks with respect to said ring, means for causing the blocks to tilt to form wedge shaped spaces between the blocks and the race upon relative rotation therebetween, means tending to tip the blocks under the influence of axial thrust load on the bearing comprising a projection on each block providing peripherally extending axially spaced surfaces oppositely oblique with respect to the axis of rotation of the bearing, a groove in said carrier ring providing complementary surfaces adapted to engage said first mentioned surfaces, a peripherally extending groove between said axially spaced surfaces and a plurality of block retaining members encircling said carrier ring, each of said retaining members extending into said last named grooves and having radially projecting portions engaging two peripherally spaced blocks to prevent relative peripheral movement between said two blocks and to limit radial displacement of the said two blocks with respect to said carrier ring.

14. A bearing comprising a carrier ring, a bearing race and a plurality of blocks positioned radially between said ring and said race, projections on said carrier ring for limiting peripheral movement of the blocks with respect to the ring, means for causing the blocks to tilt to form wedge shaped spaces between the blocks and the race upon relative rotation therebetween, means tending to tip the blocks under the influence of axial thrust load on the bearing comprising a wedge shaped peripherally extending projection on each of the blocks and a circumferential groove in the carrier ring providing surfaces adapted to engage the sides of said wedge shaped projections, said wedge shaped projections and said groove being situated axially to one side of said first named projections, a peripherally extending groove in each of the blocks, the grooves in the blocks and the groove in the carrier ring being situated on axially opposite sides of said first named projections, and a plurality of block retaining members encircling said carrier ring and extending into the grooves in the blocks, each of said blocks being engaged by at least one of said retaining members to limit radial displacement of the blocks with respect to said carrier ring.

15. A bearing block for bearings of the character described, said block being of generally rectangular configuration and having a major face providing a spherically curved surface, the opposite major face being grooved parallel to the major axis of the block to provide tilting surfaces at the edges of the groove and having a projection extending at right angles to said groove, said projection providing tipping surface oblique with respect to the general plane of said opposite face.

16. A bearing block for bearings of the character described, said block being of generally rectangular configuration and having a major face providing a spherically curved surface, the opposite major face being grooved parallel to the major axis of the block to provide tilting surfaces at the edges of the groove and a generally wedge shaped projection extending at right angles to said groove and providing spaced tipping surfaces oppositely oblique with respect to the general plane of said opposite face.

17. A bearing block for bearings of the character described, said block being of generally rectangular configuration and having a major face providing a spherically curved surface, the opposite major face being grooved parallel to the major axis of the block to provide tilting surfaces at the edges of the groove and a generally wedge shaped projection extending at right angles to said groove and providing spaced tipping surfaces oppositely oblique with respect to the general plane of said opposite face, said projection being grooved between said spaced surfaces and said groove being undercut.

18. In a bearing of the radial type comprising an inner member, an outer member, and a plurality of bearing blocks having operative positions between said members, said inner member being axially grooved to provide bearing shoulders, said blocks having irregular surfaces providing bearing surfaces adapted to slide on and off said shoulders, and said outer member and said blocks having cooperating sliding surfaces adapted to transmit axial thrust, the provision of cooperating projections and recesses in said inner member and said blocks having surfaces angularly disposed with respect to a plane transverse to the axis of rotation for tilting the blocks in an axial plane to adjust the sliding surfaces.

19. In a bearing of the radial type comprising an inner member, an outer member, and a plurality of bearing blocks having operative positions between said members, said inner member being axially grooved to provide bearing shoulders, said blocks having irregular surfaces providing bearing surfaces adapted to slide on and off said shoulders, and said outer member and said blocks having cooperating sliding surfaces adapted to transmit axial thrust, the provision of means for simultaneously transmitting axial thrust between the blocks and the inner member and tilting the blocks in an axial plane to adjust the sliding surfaces.

20. In a bearing of the radial type having spaced members and a plurality of tiltable blocks having operative positions therebetween, the aforesaid parts being radially overlapping, the provision of cooperating surfaces inclined with respect to a plane transverse to the axis of rotation for tilting the blocks in an axial plane.

21. In a bearing comprising a race member, a carrier member, and a plurality of bearing blocks having operative positions between said members, said blocks and said carrier member having cooperating irregular surfaces for tilting the blocks peripherally, and said blocks and race member having cooperating sliding surfaces, the combination with means for permitting and limiting peripheral movement of the blocks, of additional means for further restricting block movement and holding the blocks adjacent to the carrier ring.

22. In a bearing comprising a race member, a carrier member, and a plurality of bearing blocks having operative positions between said members, said blocks and said carrier member having cooperating irregular surfaces for tilting the blocks peripherally, and said blocks and race member having cooperating sliding surfaces, the combination with means for permitting and limiting peripheral movement of the blocks, of additional means for further restricting block movement and holding the blocks adjacent to the carrier ring comprising retaining members interconnecting remote blocks and having surfaces adjacent the blocks oppositely inclined to a plane transverse to the axis of rotation.

23. In a bearing comprising a race member, a carrier member, and a plurality of bearing blocks having operative positions between said members, said blocks and said carrier member having cooperating irregular surfaces for tilting the blocks peripherally, and said blocks and race member having cooperating sliding surfaces, the combination with means for permitting and limiting peripheral movement of the blocks, of additional means for further restricting block movement and holding the blocks adjacent to the carrier ring comprising peripheral grooves in said blocks having lateral walls diverging away from the axis of rotation and retaining members in said grooves interconnecting non-adjacent blocks and having surfaces adapted to contact said diverging walls.

24. In a bearing comprising a race member, a carrier member, and a plurality of bearing blocks having operative positions between said members, said blocks and said carrier member having cooperating irregular surfaces for tilting the blocks peripherally, and said blocks and race member having cooperating sliding surfaces, the combination with means for permitting and limiting peripheral movement of the blocks, of additional means for further restricting block movement and holding the blocks adjacent to the carrier ring comprising peripheral grooves in said blocks having lateral walls diverging away from the axis of rotation and rings in said grooves having projections adapted to engage non-adjacent blocks and inclined to contact said diverging walls.

AUGUST GUNNAR FERDINAND WALLGREN.